W. A. TRITTON,
TRANSPORT VEHICLE PROPELLED BY ENDLESS MOVING CHAIN TRACKS.
APPLICATION FILED JULY 24, 1917.
1,318,189.
Patented Oct. 7, 1919.
4 SHEETS—SHEET 1.
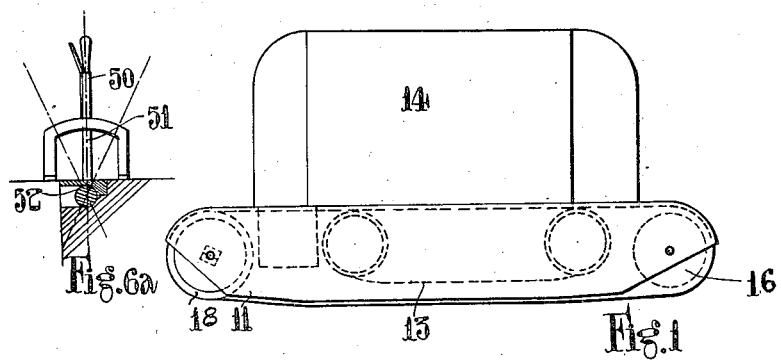
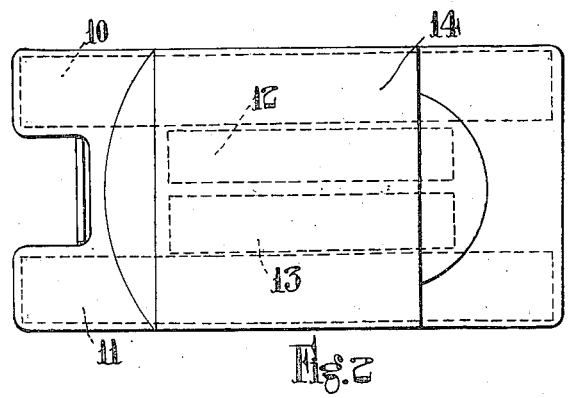
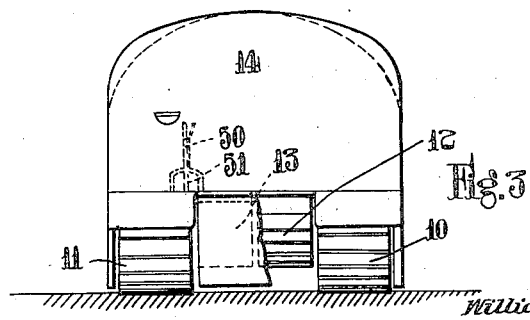
William Ashbee Tritton
INVENTOR
BY
ATTORNEYS

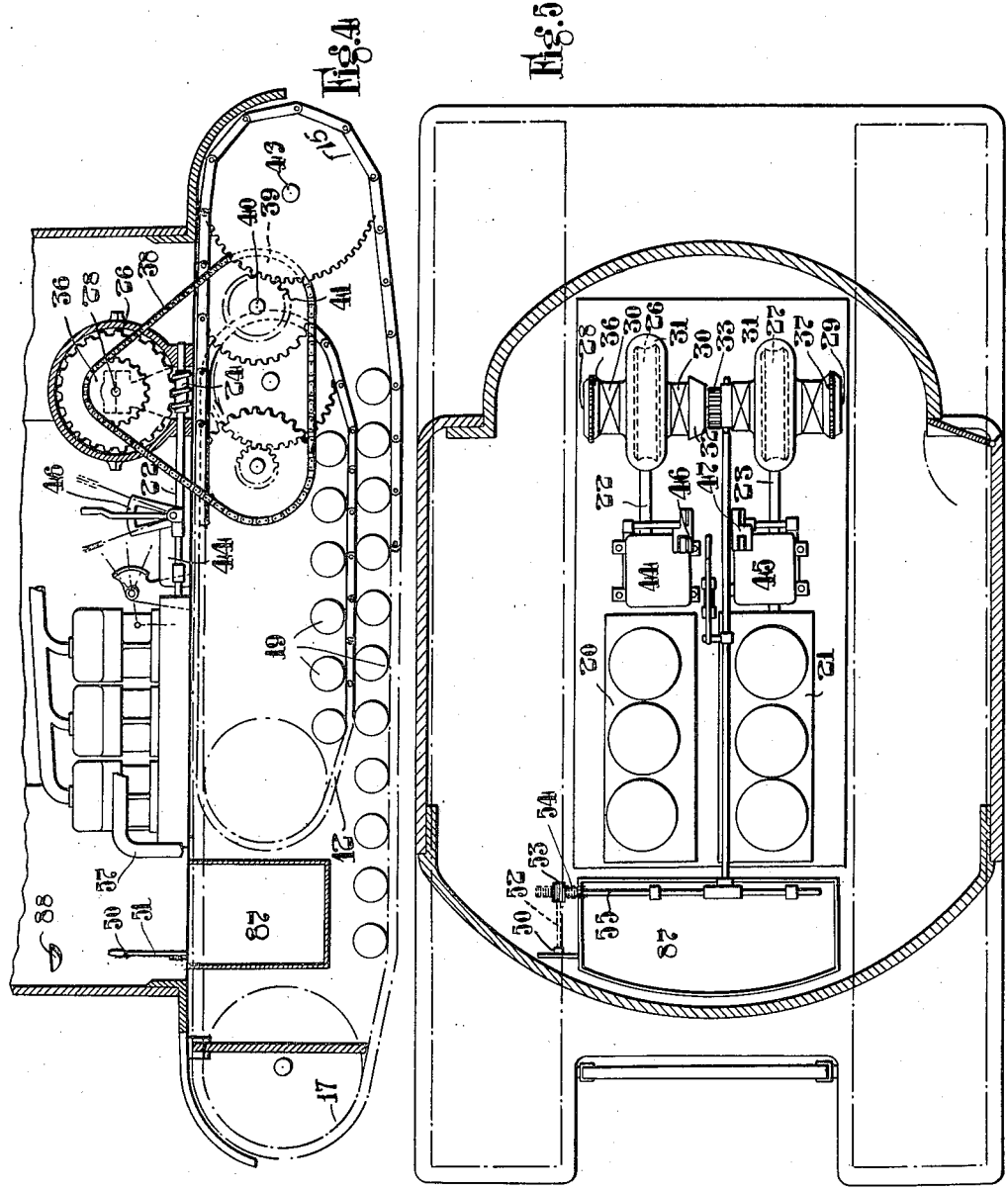

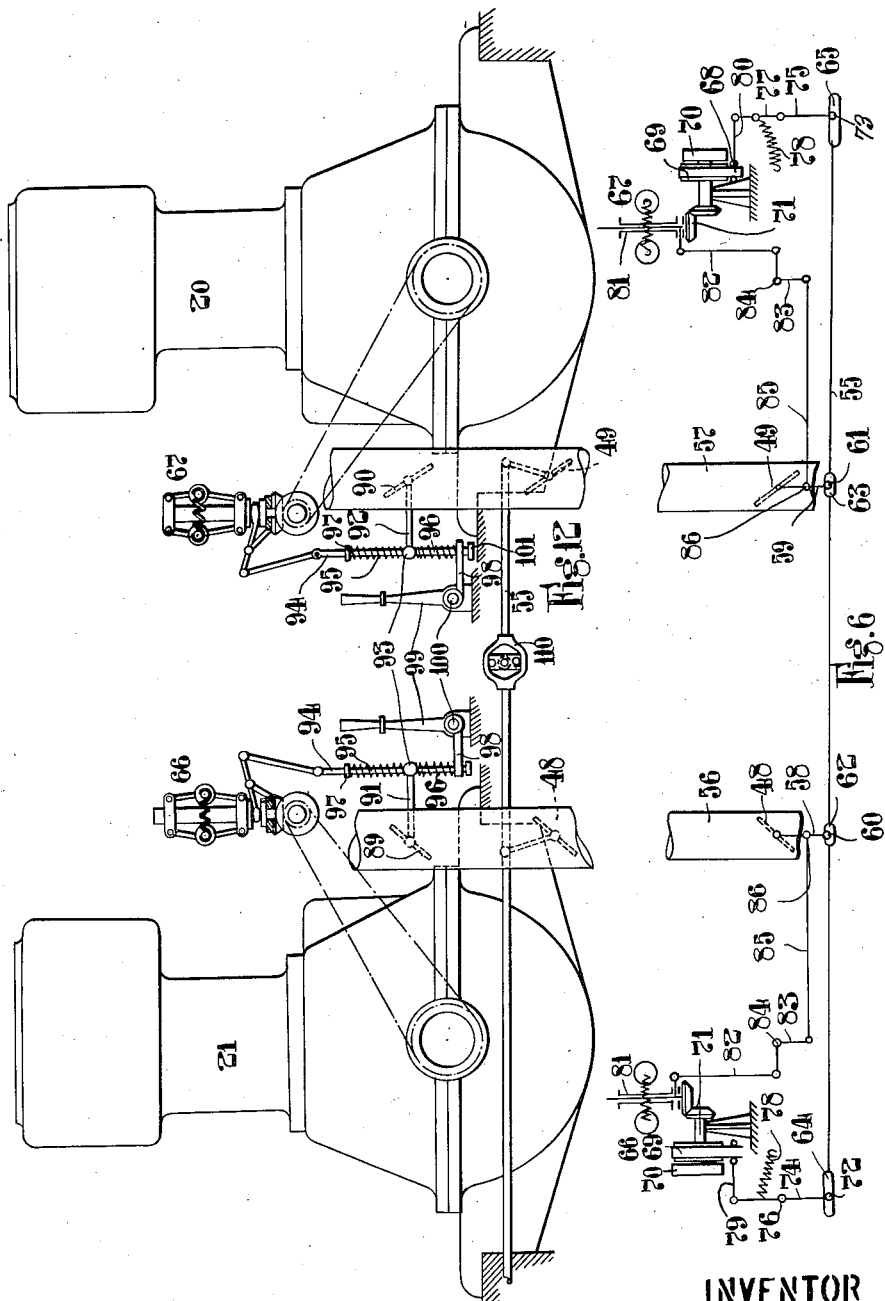

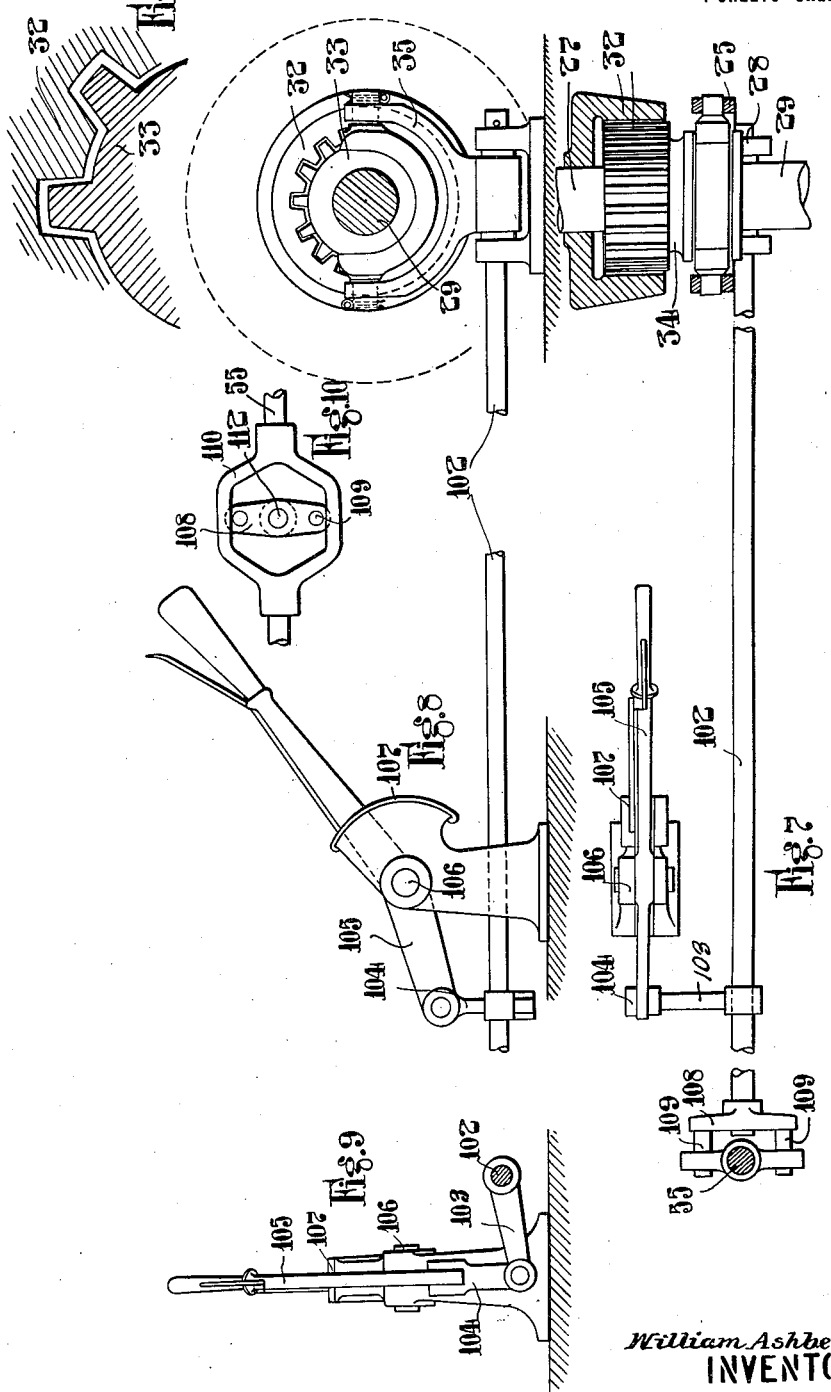

UNITED STATES PATENT OFFICE.

WILLIAM ASHBEE TRITTON, OF LINCOLN, ENGLAND.

TRANSPORT-VEHICLE PROPELLED BY ENDLESS MOVING CHAIN TRACKS.

1,318,189.   Specification of Letters Patent.   Patented Oct. 7, 1919.

Application filed July 24, 1917. Serial No. 182,565.

*To all whom it may concern:*

Be it known that I, Sir WILLIAM ASHBEE TRITTON, a subject of the King of Great Britain and Ireland, of Wellington Foundry, Firth Road, Lincoln, in the county of Lincoln, England, engineer, have invented certain new and useful Improvements in and Relating to Transport - Vehicles Propelled by Endless Moving Chain Tracks, of which the following is a specification.

This invention relates to transport vehicles propelled by endless moving chain tracks and more particularly, although not necessarily so, designed for use in military operations.

Modern warfare usually involves the travel of such vehicles over extremely broken ground which is often composed of a series of shell craters and holes often filled with water, the ground itself being largely composed of mud which is of considerable depth. Besides this, deep trenches have to be negotiated as well as parapets.

To facilitate rapid travel over such ground it is obviously desirable to skirt the holes without going down into them, which necessitates very quick, complicated and accurate steering.

To these ends the invention consists in an improved transport vehicle adapted to be propelled by two independent endless moving tracks, each driven by a separate engine, both of the tracks and engines, however, being coupled together when and if desired.

The invention also consists in an improved transport vehicle having two independent endless moving tracks having two separate engines, preferably of the internal combustion type, which is steered by simultaneously acting upon the main throttle valve of both in such a way that while one valve is being closed to slow down its engine, the other is being opened to speed up the other engine.

The invention also consists in progressively controlling the engines in such a way that when one of the throttle valves is adjusted to a predetermined degree, further controlling movement takes place against a yielding stop and cuts out the governor, thus allowing the engine to run free of governor control, the yielding stop, however, automatically throwing in the governor when the controller is released to prevent the engine continuing to run without governor control.

The invention also consists in supplementing the above system of control by the employment of the usual change speed gear so that the speed of the engines may be further varied relatively to one another.

The invention finally consists in the improved armored transport vehicle driven by a pair of endless chain tracks as hereinafter described.

The invention will now be described by way of example with reference to the accompanying drawings in which :—

Figure 1 is a side elevation,

Fig. 2 is a plan view,

Fig. 3 is an end view of a vehicle constructed according to the invention;

Fig. 4 is a longitudinal section on an enlarged scale showing the internal driving arrangements;

Fig. 5 is a plan view with the superstructure in section and diagrammatically illustrating the propelling machinery;

Fig. 6 is a diagrammatic drawing showing the engine controlling devices;

Fig. 6$^a$ is a detail;

Figs. 7 and 8 are respectively a plan view and elevation of a clutch control hereinafter described, the clutch being shown in Fig. 7;

Fig. 9 is an end view of Fig. 8;

Fig. 10 is an end view of the clutch control rod;

Fig. 11 is a detail of the clutch teeth; and

Fig. 12 is a diagrammatic view of modified means for controlling a pair of engines.

In carrying the invention into effect it is shown by way of example applied to a vehicle comprising a lower part consisting of a pair of main endless moving chain tracks, 10, 11 and a pair of auxiliary endless moving chain tracks 12, 13, between the main tracks, and an upper part or superstructure 14 which contains the motors and controlling devices and also serves to conceal and protect the crew. As is usual with such vehicles the main tracks 10, 11, are driven by sprocket wheels 15, 16 at one end, each track passing at its other end over a suitable idler sprocket wheel 17 and 18 respectively. The weight of the vehicle is carried by a series of rollers 19 carried in a suitable truck frame and rotating in contact with the back of the lower run or stretch of the endless chain tracks as is well known. The further details of the tracks, the manner in which they are supported and driven, and the general form of the vehicle do not form part of the present invention and they will not therefore be further described herein.

The propelling engines accommodated within the superstructure 14 comprise two independent motors 20, 21 supported by a suitable base or platform arranged intermediate of the superstructure and lower part of the vehicle. The motors are preferably multi-cylinder and of the internal combustion type arranged side by side, the main driving shafts 22, 23 of each extending toward the rear end of the vehicle and being provided with worm screws of which screw 24 on shaft 22 is shown in Fig. 4. These worm screws are adapted to actuate worm wheels 26, 27 mounted on separate shafts 28, 29. Bearings 30 support the shafts 28, 29 and the worm wheels are incased or closed in by covers 31 which may be formed in detachable sections, and in which bearings are provided for the free ends of the engine shafts 22, 23 as shown in Fig. 4. The shafts 28, 29 are arranged end to end and at the adjacent ends there is mounted on shaft 28 an internally toothed clutch member 32 and upon the shaft 29 is mounted a correspondingly externally toothed wheel 33. The two members constitute a clutch, the wheel 33 being fitted with the usual grooved collar 34 and adapted to be moved longitudinally on a feather carried by its shaft by the usual clutch fork 35 into or out of engagement with the other clutch member 32. To transmit the engine power to the chain tracks each of the worm wheel shafts carries a sprocket wheel 36, 37 respectively to transmit by means of the usual sprocket chain 38 the drive to a sprocket wheel 39 carried by a shaft 40 in the lower part of the frame, and on which shaft is carried a spur wheel 41 in gear with the main track driving sprocket 15 carried on a shaft 43. The above described transmission system is arranged in duplicate as will be understood for the other main track and may also be combined with a drive to the auxiliary chain tracks 12, 13 but which is not here further described. Each engine shaft 22, 23 is provided with the usual change speed mechanism, the casings for which are indicated diagrammatically at 44, 45 and may comprise a first, second and third change in speed and a reverse drive for backward propulsion, and each set is under the control of the usual change speed gear lever indicated generally by the references 46, 47.

During normal working the engines 20, 21 run independently of one another, each driving its own chain track mechanism, the relative speeds being controlled in a manner that will hereinafter be described and the clutch members 32, 33 disengaged. Should it be necessary, however, owing to the nature of the ground or any other reason, the clutch members are moved into mutual engagement, the two engines and the track mechanism running as a single unit. No differential gear is required between the engines and the track mechanism, and any usual couplings may be provided in the length of the main engine shafts to allow the frame or girders supporting the engines to have a slight movement relatively to the main supporting frame of the structure should such occur.

In order to effect a quick and very sensitive steering of the car, it is preferred to act upon the main throttle valves 48, 49 of the two engines, 21, 21 indicated diagrammatically in Fig. 12 but omitted from Fig. 6, by means of a single controlling element 50 which is shown in Fig. 4 and is in the charge of the chief operator inside the vehicle. It comprises a single upright arm 51 attached by its lower end to a horizontal shaft 52, (Fig. 6ª) at one end of which is carried a pinion 53, the teeth of which are in mesh with the teeth of a rack 54 on one end of a valve controlling rod 55. As shown in Figs. 4 and 6ª, the controlling arm 51 is adjustable from the central position shown in full lines to one side position or the other over the quadrant member shown, and which may be notched or otherwise formed to indicate predetermined positions corresponding with definite speeds and retained in any adjusted position by the usual locking lever shown. The valve-controlling rod 55 as shown in Fig. 5 is extended laterally of the engines 20, 21 and in close proximity to a pair of fuel mixture supply pipes 56, 57 shown in Figs. 6 and 12, each pipe being designed to supply all the cylinders of its particular engine. As shown in Fig. 6 the throttle valves 48, 49 each swings as usual on a center spindle supported in bearings provided in the pipe walls, and one end of each spindle is extended so that it may be fitted with an actuating arm 58, 59 respectively, such arms extending downward and each having a pin or bent end 60, 61 engaging with slots or grooves 62, 63 formed in the valve-controlling rod 55. The valves 48, 49 being oppositely arranged, a movement of the controlling rod to the right will open the valve 48 and close the valve 49, while a movement to the left will act conversely upon the valves, the arrangement thus having the effect of slowing down one engine while at the same time speeding up the other engine. To further develop such a system of control, two other slots or grooves 64, 65 are formed in the controlling rod which are adapted in the further adjustment to act upon the governors 66, 67 of the respective engines. As illustrated by way of example and in diagram, each governor is driven by means of a belt 68 from any suitable rotating part of the engine by fast and loose pulleys 69, 70 rotating the governor balls through bevel gearing 71. In engagement with the slots or grooves 64, 65 are arranged pins 72, 73 on the lower ends of levers 74, 75 fulcrumed at 76, 77, while the upper ends of the levers are adapted to actuate, against the power of a spring 78, belt striking gear 79, 80 in connection with the governor driving belts 68. The governors are fitted with the usual sleeves 81 so that the governors may automatically adjust the respective throttle valves 48, 49 by means of a link 82, bell crank lever 83 fulcrumed at 84 and link 85 attached at 86 to the respective throttle valve levers 58 or 59.

It will be noticed that in Fig. 6 the slots 62 and 63 are shorter than the slots 64 and 65, and that while the slot-engaging members 60, 61 are approximately central in their slots, the slot-engaging members 72, 73 are nearer one end than the other of their slots. In the former case the normal central position will allow the governors a certain freedom of control to adjust the throttle valves 48, 49 through the linkage 82, 83, 85, until the pins 60 or 61 come into contact with either end of their respective slots.

By the above described arrangement a system of control is established such that a progressive movement of the controlling rod 55 in either direction may be made to slow down and respectively speed up the engines at a definite rate.

Assuming that the engines are declutched and that the controlling element 50 is moved from a central position to move the controlling rod 55 (Fig. 6) toward the right with the throttle valves in a normal running position, the first part of the movement of the rod will produce no effect until the left-hand end of slots 62, 63 comes into contact with the pins 60, 61. The throttle valves will then be adjusted as desired, namely the valve 48 will be opened farther while the valve 49 will be moved toward closing position, thus regulating the quantity of mixture passing through the supply pipes 56, 57, slowing down one engine and speeding up the other.

Thus far the governors have not been affected, but should further control be required the further movement of the rod 55 will bring the left hand end of slot 64 into contact with pin 72 to cut out the governor 66 of the engine which has been "speeded up" thus permitting it to race. This is accomplished by means of a lever 74 acting upon the belt striker 79 and shifting the belt from the fast pulley 69 to the loose pulley 70, this action taking place against the action of a spring 78 which constitutes a yielding stop. Should the operator let go the controlling lever or element 50 the engine which is thus running free from control by the governor 66 will be automatically again placed under governor control by spring 78, the parts regaining their normal positions, thereby obviating all danger of the engine being left to race. In the meantime the other governor 67 remains unaffected owing to the length of the slot 65. Obviously, if the controlling rod 55 is moved the other way toward the left, then the governor 67 of the other engine is cut out.

Under normal conditions the chief operator will assume a controlling position at the front end of the vehicle where he is preferably seated on a ledge provided by a bay 87, a suitable lookout 88 being provided, and from that position he may positively and quickly control the direction and speed at which the machine travels, the central position of the controlling lever 50 corresponding to normal declutched running of the two engines.

Although the operator may thus control the speed of the engine, it will be understood that it is only within certain limits that he can adjust their speed relatively to one another, and provision is therefore made by which, in addition to his control, the usual change speed gearing indicated at 44, 45 may also be employed as well as the usual reversing gear to supplement his control of the car. For this purpose, about midway in the length of the engine chamber another operator is stationed who has under his control the usual change speed levers indicated at 46, 47, and the chief operator may communicate his orders either orally or visually to the steersman to adjust the speed levers 46, 47 in the manner desired so as to regulate the speed and the track mechanism associated therewith relatively to one another, to enable any desired maneuver to be accomplished. Thus, one engine may run at No. 1 speed while the other engine may be reversed, or such other combinations employed as may be required.

A modified governing arrangement is illustrated in Fig. 12 in which the valve-controlling rod 55 is employed to actuate the throttle valves 48, 49 but the governors 66, 67 are adapted by hand as well as automatically to regulate an additional pair of throttle valves 89, 90. The actuating levers 91, 92 of the additional valves are secured by a ball or other suitable joint 93 to a governor rod 94 encircled by helical springs 95, 96 and arranged on opposite sides of the ball joint. The springs 95 abut at one end against collars 97 on each governor rod and at the other end against the ball joint. The springs 96 each abut at one end upon the other side of the ball joint and at the other end upon one arm 98 of a bell crank lever whose other arm 99 is formed as a hand controlling lever fulcrumed at 100. The arm 98 is preferably forked to fit around the governor rod 94, such rod ending in a collar 101. The upper end of each governor rod is linked in any suitable manner to the moving sleeve or collar on the governor. For automatic control by the governor, the downward movement of the governor rod 94 will compress both springs 95, 96 and will close the throttle valve 89 or 90, leaving the hand control lever 98 unaffected. For hand control the lever 98 will compress both of the springs 95, 96, will open the throttle valves farther, the governor rod being put out of action by the rigidity of the springs and allowing the engine to run free. The parts will return to normal position as soon as the control lever 99 is released.

It should be noticed that if the two hand levers 99 be positioned closely together so that they may be grasped in one hand, the speed of the vehicle will be controlled by their combined movement and independently of the steering control. Alternatively, the two hand levers may be coupled mechanically or flexibly by springs.

Further, the lever 50 may be replaced by a wheel of the usual type if so desired, operating the control rods by rack and pinion as already explained.

Should it be desired to work the engines and tracks coupled up as a single unit, the clutch members 32, 33 are made to interengage, and to facilitate their mutual engagement the spaces in one member are preferably made larger than is necessary to receive the corresponding teeth of the other member as shown in Fig. 11. When the clutch parts are mutually engaged, the central control 50 is no longer required and arrangements are therefore made to lock it in its central position to prevent any interference with the running of the engines. Speed control of the vehicle will then take place by the simultaneous operation of the hand levers 99.

Referring more particularly to Figs. 7, 8 9 and 10, the clutch fork 35 is actuated by a rod 102 arranged midway of the engines and extending to within a short distance of the valve-controlling rod 55. About midway of its length it is fitted with a crank arm 103 which is connected by a link 104 to one end of a clutch actuating lever 105 fulcrumed at 106 and working on a quadrant 107 and having the usual locking lever, the position of such clutch lever being within reach of the operator who is in charge of the change speed mechanism.

To interlock the valve controlling rod 55 with the clutch rod 102, the end of the latter carries a cross-head 108 having two projecting pins 109 positioned within a locking member 110 arranged at a convenient point in the length of the controlling rod 55 as shown, for example, in Fig. 12, but which is omitted in Fig. 6. With the clutch members 32, 33 disengaged the cross-head locking pins 109 will be in the position shown in Fig. 10 which will unlock the member 110 to permit the movement of the valve-controlling rod 55. When the lever 105 is actuated to throw in the clutch, the resulting movement will move the locking pins 109 through an arc of 90°, thereby substantially preventing the rod 55 from being moved.

From the foregoing description it will be seen that a vehicle is produced which may be steered with great ease and that maneuvers may be rapidly accomplished and, moreover, the machine may be reversed or turned around practically in its own length.

It is to be understood that the present invention is not confined to constructions and details hereinbefore described, but that they may be changed and modified in various ways without departing from the underlying inventive idea.

Having now described my invention what I claim as new and desire to secure by Letters Patent is:—

1. An improved transport vehicle comprising in combination a pair of endless moving tracks, a shaft for driving each track, a separate internal combustion engine for driving each shaft, throttle valve means to regulate the fuel supply to each engine, a governor on each engine, means for so adjusting each throttling means that while one engine is slowed down, the other throttling means is being simultaneously adjusted to speed up the other engine, means whereby after each engine has been controlled to a predetermined degree, the governor of the fast running engine is cut out to permit it to race, and automatic means to throw in the governor against should the control of the throttle means be removed.

2. An improved transport vehicle comprising in combination a pair of endless moving tracks, a shaft for driving each track, a separate internal combustion engine for driving each shaft, a main throttle valve to regulate the fuel supply to each engine, means for so progressively controlling each valve that, while one slows down, the other speeds up its engine, a governor for each engine, a yielding stop connected to the governor and adapted to be actuated by the valve controlling member after a predetermined amount of control has been effected to cut out the governor of the fast running engine, and means whereby the yielding stop throws in the governor again if the control is removed in order to prevent the engine continuing to run without governor control.

3. An improved transport vehicle comprising in combination a pair of endless moving tracks, a shaft for driving each track, a separate engine for driving each shaft, a clutch member for coupling the said shafts together, simultaneously acting means for speeding up one engine and slowing down the other, a single control for operating such means, means for operating the clutch member which interlock with the single control to lock the latter in a neutral position when the clutch member is in coupling position.

4. An improved transport vehicle, comprising in combination a pair of endless moving chain tracks, a shaft for driving each track, a separate engine for driving each shaft, a slotted bar arranged transversely of the engines, a main throttle valve to each engine, an actuating lever for each valve and engaging slots in said bar, a governor to each engine, means for cutting out said governors which are in engagement with other slots in said bar, rack teeth on one end of the bar, a pinion in engagement with said teeth, and manually operated means for partially rotating the pinion to actuate the said rack and bar for the purpose described.

5. An improved transport vehicle comprising in combination a pair of endless moving tracks, a shaft for driving each track, a separate internal combustion engine for driving each shaft, a primary control by which one engine is speeded up and the other simultaneously slowed, a secondary control by which the transmitted speed of each engine is adjusted independently of the other, a governor for each engine which is adapted to be cut out when desired by progressive movement from the primary control, a clutch between the two track driving shafts, and means for operating the clutch member interlocking with the primary control to lock the latter in a neutral position when the clutch member is in coupling position.

6. An improved transport vehicle having two independent endless moving tracks each driven by a separate engine, in which the steering control is separate from the vehicle speed control but whereby the steering control regulation is superimposed on the speed control by means of two throttles in series on each engine.

7. An improved transport vehicle having two independent endless moving tracks each driven by a separate governor control comprising a rod, a ball joint thereon connected to a throttle valve, lever springs on the rod each abutting at one end against the ball joint and on opposite sides thereof, and a hand lever, substantially as hereinbefore described.

8. An improved transport vehicle having two independent endless moving tracks each driven by a separate engine, in which, when the clutch between the engines is actuated, an interlocking device is simultaneously operated to respectively lock or unlock the engine controlling element as the clutch is respectively thrown in or out.

In testimony whereof I have signed my name to this specification.

WILLIAM ASHBEE TRITTON.